United States Patent
Munenaka et al.

(10) Patent No.: US 10,479,119 B2
(45) Date of Patent: Nov. 19, 2019

(54) TWO-DIMENSIONAL IMAGE-FORMING APPARATUS, THREE-DIMENSIONAL FABRICATION APPARATUS, TWO-DIMENSIONAL IMAGE-FORMING METHOD AND THREE-DIMENSIONAL FABRICATION METHOD

(71) Applicant: Konica Minolta, Inc., Tokyo (JP)

(72) Inventors: Taiya Munenaka, Tokyo (JP); Kuniaki Kashiwakura, Aichi (JP); Yoshiyuki Hashimoto, Tokyo (JP); Teruaki Yagura, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 159 days.

(21) Appl. No.: 15/111,115

(22) PCT Filed: Dec. 2, 2014

(86) PCT No.: PCT/JP2014/081872
§ 371 (c)(1),
(2) Date: Jul. 12, 2016

(87) PCT Pub. No.: WO2015/107789
PCT Pub. Date: Jul. 23, 2015

(65) Prior Publication Data
US 2016/0339724 A1 Nov. 24, 2016

(30) Foreign Application Priority Data

Jan. 16, 2014 (JP) .................................. 2014-005863

(51) Int. Cl.
*B29C 67/00* (2017.01)
*B33Y 30/00* (2015.01)
(Continued)

(52) U.S. Cl.
CPC ............. *B41J 25/003* (2013.01); *B33Y 30/00* (2014.12)

(58) Field of Classification Search
CPC ...................................................... B29C 64/112
See application file for complete search history.

(56) References Cited

U.S. PATENT DOCUMENTS 5,144,330 A * 9/1992 Bennett ...................... B41J 2/01
347/106
7,303,244 B2 * 12/2007 Ready ................... H01L 21/288
257/E21.174

(Continued)

FOREIGN PATENT DOCUMENTS

JP  02-307732 A  12/1990
JP  05-096728 A   4/1993

(Continued)

OTHER PUBLICATIONS

Written Opinion of the International Searching Authority, dated Jul. 16, 2016, 7 pgs., mailed from the Internation Bureau of WIPO, Geneva, Switzerland.

(Continued)

*Primary Examiner* — Jason L Lazorcik
(74) *Attorney, Agent, or Firm* — Baker Hostetler LLP

(57) ABSTRACT

The three-dimensional fabrication apparatus is provided with: a first discharge section and a second discharge section, which have multiple discharge nozzles disposed in rows and which discharge molding material from the discharge nozzles toward a fabrication stage; a guide member of a head unit-moving unit, which is equipped with the guide member to guide the movement of the first discharge section and the second discharge section in the main scanning direction (X-direction) that is orthogonal to the direction in which the discharge nozzles are disposed and which moves the first discharge section and the second discharge section (Continued)

relative to the fabrication stage along said guide member; and a stage rotating unit for changing the rotational position of the main scanning direction of the first discharge section and the second discharge section relative to the fabrication stage.

9 Claims, 10 Drawing Sheets

(51) Int. Cl.
    *B33Y 10/00*           (2015.01)
    *B41J 25/00*           (2006.01)

(56) References Cited

U.S. PATENT DOCUMENTS

| | | | | |
|---|---|---|---|---|
| 7,658,464 | B2* | 2/2010 | Silverbrook | B22F 3/008 |
| | | | | 2/7 |
| 2001/0019340 | A1* | 9/2001 | Kubo | B41J 2/01 |
| | | | | 347/1 |
| 2003/0203643 | A1* | 10/2003 | Hasei | B41J 2/14233 |
| | | | | 438/758 |
| 2004/0257399 | A1* | 12/2004 | Iwata | B41J 2/04563 |
| | | | | 347/40 |
| 2005/0168517 | A1* | 8/2005 | Usuda | B41J 2/16508 |
| | | | | 347/29 |
| 2005/0243112 | A1 | 11/2005 | Kobayashi et al. | |
| 2006/0017757 | A1* | 1/2006 | Goto | B41J 2/0458 |
| | | | | 347/9 |
| 2008/0152880 | A1* | 6/2008 | Kinoshita | B41J 2/04505 |
| | | | | 428/212 |
| 2008/0225097 | A1* | 9/2008 | Takiguchi | B41J 2/14233 |
| | | | | 347/100 |
| 2009/0009812 | A1* | 1/2009 | Sirringhaus | B41J 2/2146 |
| | | | | 358/3.26 |
| 2009/0186202 | A1* | 7/2009 | Shibatani | B41J 2/14233 |
| | | | | 428/195.1 |
| 2010/0142757 | A1* | 6/2010 | Sandstrom | G02B 26/105 |
| | | | | 382/100 |
| 2013/0215196 | A1* | 8/2013 | Lewartowski | B41J 25/001 |
| | | | | 347/37 |
| 2014/0368568 | A1* | 12/2014 | Kodama | B41J 25/003 |
| | | | | 347/9 |
| 2015/0251360 | A1* | 9/2015 | Steele | B33Y 10/00 |
| | | | | 264/308 |
| 2016/0288153 | A1* | 10/2016 | Shinoda | B05C 5/0291 |
| 2017/0173886 | A1* | 6/2017 | Menchik | B33Y 30/00 |

FOREIGN PATENT DOCUMENTS

| | | |
|---|---|---|
| JP | 2005-246248 A | 9/2005 |
| JP | 2010-056522 A | 3/2010 |
| JP | 2010-169890 A | 8/2010 |
| JP | 2013-067121 A | 4/2013 |
| JP | 2013-208878 A | 10/2013 |

OTHER PUBLICATIONS

Written Opinion of the International Searching Authority, from PCT/JP2014/081872 with an international filing date ot Dec. 2, 2014, dated Jul. 28, 2016 7pgs., Internation Bureau of WIPO, Geneva, Switzerland.

Japan Patent Application No. 2015-557730; Notice of Reasons for Rejection; dated Jul. 10, 2018; 10 pages.

* cited by examiner

TWO-DIMENSIONAL IMAGE-FORMING APPARATUS, THREE-DIMENSIONAL FABRICATION APPARATUS, TWO-DIMENSIONAL IMAGE-FORMING METHOD AND THREE-DIMENSIONAL FABRICATION METHOD

CROSS-REFERENCE TO RELATED APPLICATIONS

This application is a U.S. National Stage filing, under 35 U.S.C. 371, of International Application No. PCT/JP2014/081872, filed Dec. 2, 2014, which claims the benefit of Japanese application number 2014-005863, filed Jan. 16, 2014, the disclosures of which, including the specification, drawings, and abstract, are incorporated herein by reference in their entirety.

BACKGROUND OF THE INVENTION

Technical Field

The present invention relates to a two-dimensional image forming apparatus, a three-dimensional shaping apparatus, a two-dimensional image forming method and a three-dimensional shaping method.

Background Art

Ink-jet two-dimensional image forming apparatuses (for example, ink-jet printers) are known which discharge an image formation material in a form of a micro droplet from an ink-jet head having a micro discharge nozzle to form a two-dimensional image. As with other printing systems, the ink-jet system has been improved for printing with high image quality and high-definition. In addition, since printing can be performed without bringing the ink-jet head into contact with the printing object, the ink-jet system can be used for greater variety of printing objects, and are used in many industrial fields.

In addition, ink-jet three-dimensional shaping apparatuses for shaping a three-dimensional article (hereinafter referred to as "three-dimensional object") are known. Three-dimensional shaping apparatuses use a technique called rapid prototyping (RP). This technique is a technique of shaping a three-dimensional object by using data (data of STL (Standard Triangulated Language) format) describing the surface of one three-dimensional object as a collection of triangles, by calculating a cross-sectional shape thinly cut in the lamination direction, and by forming each layer in accordance with the shape. In addition, known examples of methods of shaping a three-dimensional object include fused deposition molding (FDM), ink-jet binder methods, stereo lithography (SL), selective laser sintering (SLS) and the like as well as ink-jet methods.

An ink-jet three-dimensional shaping apparatus forms one shaping material layer (two-dimensional image) through a step of selectively discharging a shaping material (image formation material) from an ink-jet head to a shaping stage, a step of flattening the surface, and a step of curing the shaping material (in the case of a photosetting resin, light irradiation step), and the shaping material layers are stacked on one another to thereby shape a three-dimensional object, for example. With this method, high-definition shaping material layers are formed by discharging a shaping material in a form of a micro droplet (droplet diameter: several tens of micrometers) based on the three-dimensional shape of the shaping object and thus a high-definition three-dimensional object can be shaped by stacking the high-definition shaping material layers on one another. In addition, an ink-jet head (so-called line head) in which a plurality of discharging nozzles are arranged and sub scanning is unnecessary is used as the ink-jet head so that even a large three-dimensional object can be shaped in a relatively short time.

PTL 1 discloses an ink-jet printer which includes a first ink-jet head for printing in one direction and a second ink-jet head for printing in the other direction intersecting with the one direction for the purpose of printing a pattern having different directions with the same quality. PTL 2 discloses an ink-jet printer in which an ink-jet head is provided with a rotation member which is rotatable on the surface parallel to the printing surface. PTL 3 discloses an ink-jet three-dimensional formation apparatus.

CITATION LIST

Patent Literatures

PTL 1
Japanese Patent Application Laid-Open No. 2010-56522
PTL 2
Japanese Patent Application Laid-Open No. 5-96728
PTL 3
Japanese Patent Application Laid-Open No. 2-307732

SUMMARY OF THE INVENTION

Technical Problem

However, disadvantageously, when a two-dimensional image is formed with use of the two-dimensional image forming apparatus or the three-dimensional shaping apparatus, non-uniformity (unevenness) of the impinging position of the droplet is caused, and consequently the quality of the resulting two-dimensional image is reduced. This results in reduction in the quality of a three-dimensional object in the case where a three-dimensional object is shaped. The impinging position of the droplet is varied since there are many factors until the droplet discharged from the ink-jet head makes contact with the printing object (the shaping stage or the like). The examples of the factors include variation in the quality of the ink-jet head, clogging of the discharge nozzle, variation in the viscosity of the droplet, the movement direction of the ink-jet head, the relative positional relationship between the printing object and the ink-jet head, and the like.

This problem is described in detail with reference to FIG. 1. FIG. 1 illustrates a state where pentagon 20 (two-dimensional image) composed of a plurality of line segments (straight lines) is formed by discharging droplets of an image formation material while moving ink-jet head 12 in which a plurality of discharge nozzles 10 are linearly arranged in the X direction in the drawing. As illustrated in FIG. 1, ink-jet head 12 is disposed such that line segment B can be printed with one discharge nozzle 10 by moving in the main scanning direction (the X direction in the drawing) orthogonal to the arrangement direction of discharge nozzle 10 (the Y direction in the drawing). Since one discharge nozzle 10 is used, when line segment B is printed, almost no deflection of the droplets with respect to the Y direction in the drawing is caused and the line width of the entire line segment B is uniformized. As a result, the reproducibility of line segment B is high.

On the other hand, line segment A is printed by discharging droplets with use of multiple discharge nozzles 10 when ink-jet head 12 reaches a position where line segment A should be formed (in the case of FIG. 1, droplets are simultaneously discharged at a certain timing from discharge nozzles 10). Therefore, line segment A tends to reflect the error of discharge nozzles 10 (to be more specific, the error of the discharge timing), and easily causes variation of the impinging position of the droplets. Consequently, jaggy (stepwise jagged portion) is formed in printed line segment A, and as a result, the reproducibility of line segment A is low.

In addition, line segment C is an oblique line and is not parallel to the main scanning direction of ink-jet head 12 (the X direction in the drawing) and the arrangement direction of discharge nozzle 10 (the Y direction in the drawing), and therefore line segment C is printed with the droplets impinged in a stepwise manner. Therefore, jaggy is formed in the printed line segment C, and as a result, the reproducibility of the printed line width C is low.

As described with reference to FIG. 1, anisotropy of the reproducibility of printed line segments A to C is caused due to the relationship with the main scanning direction of ink-jet head 12 when a two-dimensional image is formed. Under such circumstances, the users strongly desire to control the reproducibility of the line width such that an intended line width of line segments A to C included in two-dimensional image is obtained (for example, such that the reproducibility of the line width of line segments A to C is uniformized).

With the technique disclosed in PTL 1, in line segments A to C illustrated in FIG. 1, the reproducibility of line segments A and B which are parallel to the movement direction of the first ink-jet head and the second ink-jet head (main scanning direction) can be ensured; however, the reproducibility of line segment C which is not parallel to the movement direction cannot be ensured. In addition, with the technique disclosed in the PTL 2, the resolution can be changed by providing the ink-jet head in a rotatable manner in the plane parallel to the printing surface and by adjusting the angle to the main scanning direction; however, the formation of the jaggy cannot be avoided. In addition, with the apparatus disclosed in PTL 3, a discharge nozzle which discharges a shaping material from a horizontal direction can rotate around the shaping article; however, PTL 3 does not discloses that a guide member which guides a discharge head for discharging toward the stage in the main scanning direction is rotated with respect to the stage.

An object of the present invention is to provide a two-dimensional image forming apparatus, a three-dimensional shaping apparatus, a two-dimensional image forming method and a three-dimensional shaping method which can control the reproducibility of the line width of straight lines of a two-dimensional image.

Solution to Problem

A two-dimensional image forming apparatus according to an embodiment of the present invention includes: a discharge part including a plurality of linearly arranged discharge nozzles, the discharge part being configured to discharge an image formation material toward a stage from the discharge nozzles; a main scanning direction movement part including a guide member configured to guide movement of at least one of the discharge part and the stage in a main scanning direction intersecting with an arrangement direction of the discharge nozzles, the main scanning direction movement part being configured to relatively move the discharge part with respect to the stage along the guide member; and a rotation part configured to rotate at least one of the guide member and the stage in a plane parallel to the stage to change a relative rotation position of the main scanning direction and the stage. A two-dimensional image is formed on the stage with the image formation material discharged from the discharge nozzles.

A three-dimensional shaping apparatus according to an embodiment of the present invention includes: a discharge part including a plurality of linearly arranged discharge nozzles, the discharge part being configured to discharge an image formation material toward a stage from the discharge nozzles; a main scanning direction movement part including a guide member configured to guide movement of at least one of the discharge part and the stage in a main scanning direction intersecting with an arrangement direction of the discharge nozzles, the main scanning direction movement part being configured to relatively move the discharge part with respect to the stage along the guide member; and a rotation part configured to rotate at least one of the guide member and the stage in a plane parallel to the stage to change a relative rotation position of the main scanning direction and the stage; a height direction movement part configured to move at least one of the discharge part and the stage in a height direction. A three-dimensional object is shaped by sequentially forming a two-dimensional image on a shaping surface on the stage with the image formation material discharged from the discharge nozzles and by laminating the two-dimensional image in the height direction.

A two-dimensional image forming method according to an embodiment of the present invention includes: discharging an image formation material from a plurality of linearly arranged discharge nozzles configured to discharge the image formation material toward a stage while relatively moving a discharge part including the discharge nozzles with respect to the stage along a guide member in a main scanning direction intersecting with an arrangement direction of the discharge nozzles; changing a relative rotation position of the main scanning direction and the stage by rotating at least one of the guide member and the stage in a plane parallel to the stage; and discharging the image formation material from the discharge nozzles to the stage whose rotation position with respect to the main scanning direction is changed while relatively moving the discharge part with respect to the stage in the main scanning direction.

A three-dimensional shaping method for shaping a three-dimensional object according to an embodiment of the present invention includes: discharging an image formation material from a plurality of linearly arranged discharge nozzles configured to discharge the image formation material toward a stage while relatively moving a discharge part including the discharge nozzles with respect to the stage along a guide member in a main scanning direction intersecting with an arrangement direction of the discharge nozzles; changing a relative rotation position of the main scanning direction and the stage by rotating at least one of the guide member and the stage in a plane parallel to the stage; discharging the image formation material from the discharge nozzles to the stage whose rotation position with respect to the main scanning direction is changed while relatively moving the discharge part with respect to the stage in the main scanning direction; moving at least one of the discharge part and the stage in a height direction; discharging the image formation material from the discharge nozzles to the stage whose position in the height direction with respect to the discharge part is changed while relatively moving the discharge part with respect to the stage in the main scanning direction; and sequentially forming a two-dimensional image on a shaping surface on the stage with the image formation material discharged from the discharge nozzles and laminating the two-dimensional image in the height direction.

Advantageous Effects of Invention

According to the present invention, in a plane parallel to the stage, the relative rotation position of the main scanning direction of the discharge part and the stage can be arbitrarily changed. Accordingly, the degree of the parallelism between the straight lines of the two-dimensional image formed on the stage and the movement direction of the discharge part (discharge nozzle) can be arbitrarily changed. Accordingly, the reproducibility of the line width of the straight lines of the two-dimensional image can be controlled. In addition, the three-dimensional shaping apparatus according to an embodiment of the present invention can control the reproducibility of the shape of the surface of a three-dimensional object.

DESCRIPTION OF EMBODIMENTS

Figure 1:
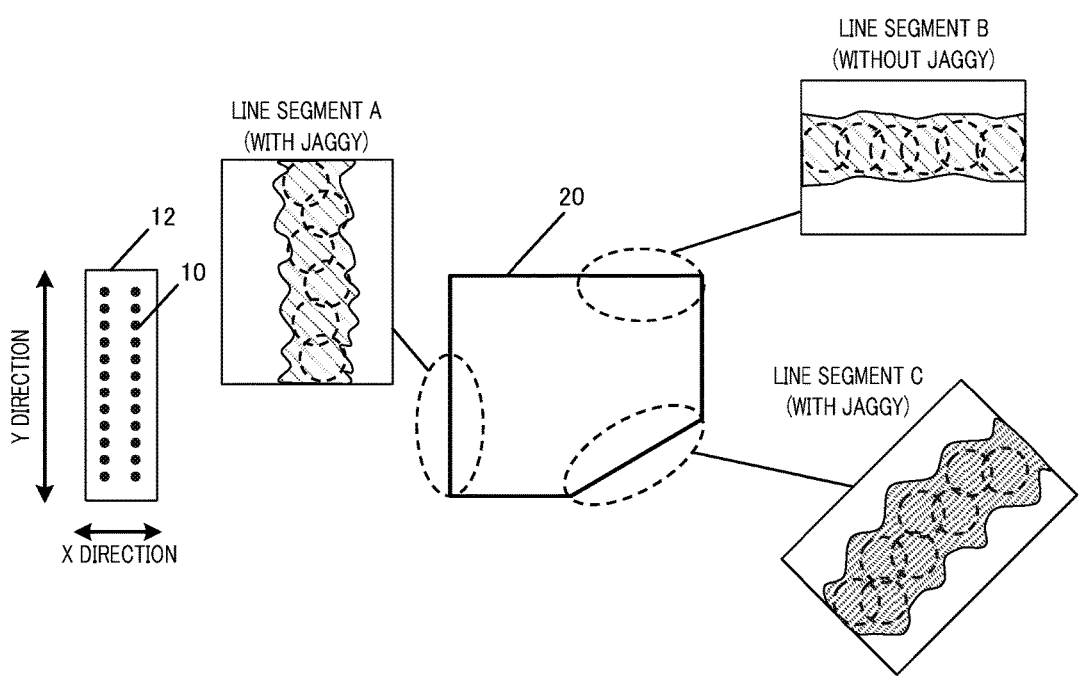
FIG. 1 is an explanatory view of problems of a conventional technology.
Figure 2:
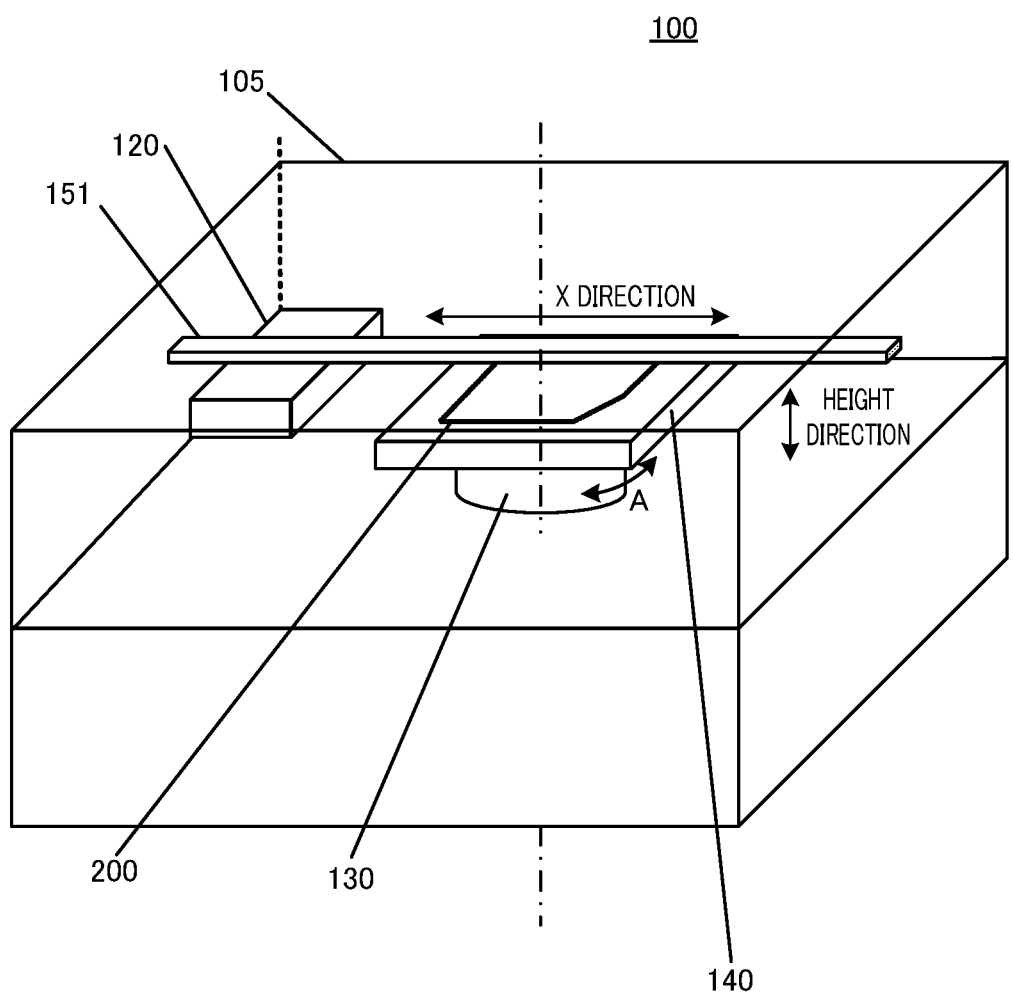
FIG. 2 schematically illustrates a configuration of a three-dimensional shaping apparatus according to an embodiment.
Figure 3:
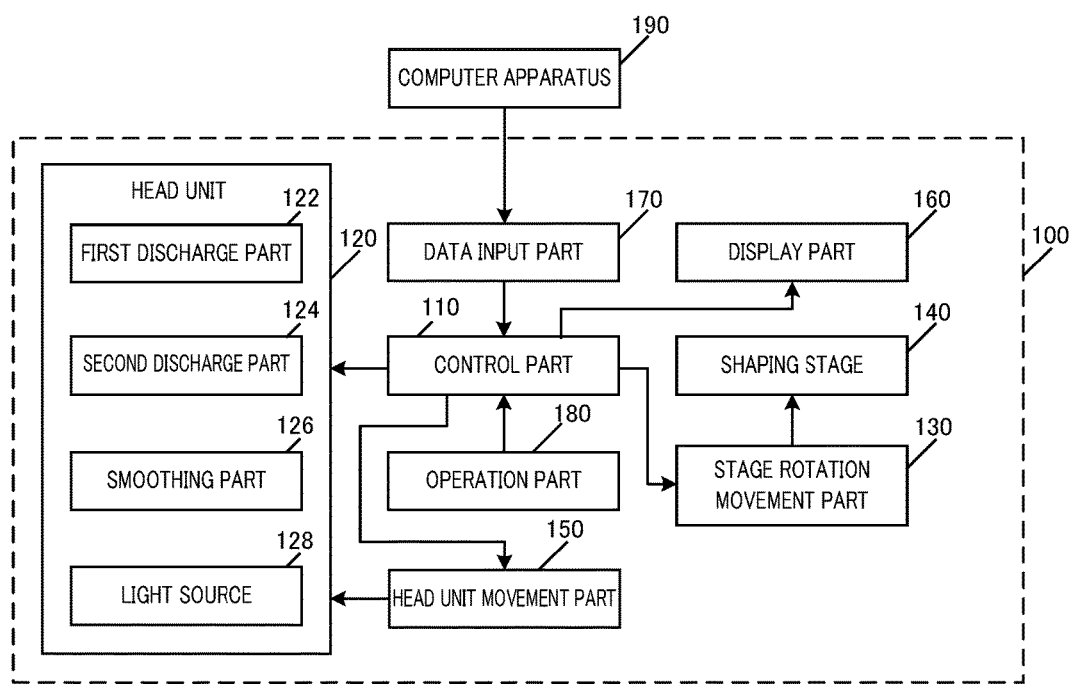
FIG. 3 illustrates a principal part of a control system of the three-dimensional shaping apparatus according to the embodiment.

In the following, an embodiment is described in detail with reference to the drawings. FIG. 2 schematically illustrates a configuration of three-dimensional shaping apparatus 100 according to the present embodiment. FIG. 3 illustrates a principal part of a control system of three-dimensional shaping apparatus 100 according to the present embodiment. Three-dimensional shaping apparatus 100 illustrated in FIGS. 2 and 3 shapes three-dimensional object 200 by sequentially forming and laminating shaping material layers 210 (two-dimensional images) composed of a shaping material (image formation material) on shaping stage 140.

Three-dimensional shaping apparatus 100 includes, in casing 105, control part 110 for controlling each part and handling 3D data, head unit 120 for performing shaping with use of a shaping material, shaping stage 140 on which to form three-dimensional object 200, stage rotation movement part 130 for rotating and moving shaping stage 140 in the height direction, head unit movement part 150 for moving shaping stage 140 and head unit 120 in the main scanning direction, display part 160 for displaying various kinds of information, data input part 170 for exchanging various kinds of information such as 3D data with an external device, and operation part 180 for receiving a request of the user. To three-dimensional shaping apparatus 100, computer apparatus 190 is connected. Computer apparatus 190 is configured to design a shaping object, or generate shaping data based on three-dimensional information obtained through measurement of a real object using a three-dimensional measurement device. In the present embodiment, head unit movement part 150 functions as a main scanning direction movement part for moving head unit 120 including a discharge part described later in the main scanning direction. In addition, stage rotation movement part 130 functions as a rotation part for changing the relative rotation position of the main scanning direction and shaping stage 140 by rotating at least one of shaping stage 140 and a guide member described later in the plane parallel to shaping stage 140.

Data input part 170 receives 3D data (such as CAD data and design data) representing the three-dimensional shape of a shaping object from computer apparatus 190, and outputs the data to control part 110. The CAD data and the design data may include color image information of a part of the surface of the shaping object or the entire surface of the shaping object and color image information of the interior of the shaping object, as well as the three-dimensional shape of the shaping object. It is to be noted that the method for acquiring 3D data is not particularly limited. 3D data may be acquired through short-range radio communication such as wired communication, radio communication, and Bluetooth (registered trademark), or may be acquired from a recording medium such as a universal serial bus (USB) memory. In addition, 3D data may be acquired from a server that manages and stores the 3D data, or the like.

Control part 110 has a computing part such as a CPU (Central Processing Unit). Control part 110 acquires 3D data from data input part 170, and performs analysis processing and arithmetic processing of the acquired 3D data. Control part 110 converts 3D data acquired from data input part 170 into pieces of slice data thinly cut with respect to the lamination direction. The pieces of slice data are data of respective shaping material layers for shaping three-dimensional object 200. The thickness of the slice data, that is, the thickness of the shaping material layer, is equal to the distance (lamination pitch) corresponding to the thickness of one layer of the shaping material layer. For example, in the case where the thickness of the shaping material layer is 0.05

[mm], control part 110 cuts out continuous 20 pieces of slice data required for lamination of 1 [mm] from the 3D data.

In addition, during the shaping operation of three-dimensional object 200, control part 110 controls the entire operation of three-dimensional shaping apparatus 100. For example, control part 110 outputs mechanism controlling information for discharging the shaping material to a desired place to stage rotation movement part 130 and head unit movement part 150, and outputs slice data to head unit 120. That is, control part 110 controls head unit 120, stage rotation movement part 130 and head unit movement part 150 in a synchronizing manner.

Under the control of control part 110, display part 160 indicates various kinds of information and messages required to be recognized by the user. Operation part 180 includes various operation keys such as numeric keys and a start key, receives various input operations performed by a user, and outputs operation signals to control part 110.

Shaping stage 140 is disposed below head unit 120. On shaping stage 140, shaping material layers are formed and stacked by head unit 120 so as to shape three-dimensional object 200. To be more specific, when forming one shaping material layer, head unit 120 discharges the shaping material toward shaping stage 140 while moving from one end to the other end on shaping stage 140 in a main scanning direction (X direction in the drawing) orthogonal to the arrangement direction of the discharge nozzles of head unit 120 (first operation). Next, head unit 120 once stops the discharge of the shaping material, and moves from the other end to one end in the X direction on shaping stage 140 (second operation). Through the first operation and the second operation, head unit 120 moves in a predetermined region on shaping stage 140 and forms one shaping material layer.

As illustrated in FIG. 2, head unit movement part 150 includes guide member 151 (linear guide) attached on housing 105, and a driving mechanism including a driving source of a motor not illustrated and the like. Guide member 151 is a guide member which is engaged with the upper part of head unit 120, and configured to guide head unit 120 to move in the main scanning direction along shaping stage 140 on shaping stage 140. In accordance with mechanism controlling information output from control part 110, head unit movement part 150 freely moves head unit 120 in the main scanning direction with use of a driving mechanism not illustrated (see FIG. 2). In this manner, head unit 120 moves along shaping stage 140. It is also possible to adopt a configuration in which the position of head unit 120 is fixed and shaping stage 140 is moved in the main scanning direction, or a configuration in which both head unit 120 and shaping stage 140 are moved in the main scanning direction.

Stage rotation movement part 130 supports shaping stage 140 such that shaping stage 140 is rotatable about the rotation axis extending in the vertical direction, and drives a driving mechanism and a motor not illustrated in accordance with the mechanism controlling information output from control part 110, and, rotates shaping stage 140 in arrow A direction in the drawing with respect to guide member 151 of head unit movement part 150 in a plane parallel to the shaping material supporting surface of shaping stage 140. That is, stage rotation movement part 130 changes the relative rotation position of shaping stage 140 and the movement direction (main scanning direction) of head unit 120 by head unit movement part 150. It is to be noted that stage rotation movement part 130 itself may rotate while supporting shaping stage 140 to rotate shaping stage 140, or stage rotation movement part 130 may have a rotational body for supporting shaping stage 140 to rotate shaping stage 140 by rotating the rotational body. Preferably, the rotation amount of shaping stage 140 by stage rotation movement part 130 can be controlled with a precision of several micrometers. It is to be noted that rotational direction A may be clockwise or counterclockwise as viewed from the upper side of shaping stage 140. Control part 110 may determine the rotational direction based on slice data such that the rotation is minimized for forming a two-dimensional image to perform rotation in the determined direction.

In addition, stage rotation movement part 130 itself goes down in accordance with the mechanism controlling information output from control part 110 and moves shaping stage 140 downward in the height direction (the vertical direction in FIG. 2) to adjust the distance between head unit 120 and three-dimensional object 200. That is, shaping stage 140 can be moved by stage rotation movement part 130 in the height direction and the surface of shaping stage 140 is the shaping surface of the first shaping material layer, and, after Nth (N is a natural number) shaping material layer is formed on shaping stage 140, shaping stage 140 is moved downward in the height direction by the lamination pitch. Then, after N+1th shaping material layer is formed on shaping stage 140 with the top surface of the Nth shaping material layer serving as the next shaping surface, shaping stage 140 moves downward by the lamination pitch in the height direction. It is to be noted that the position of shaping stage 140 in the height direction may be fixed to move head unit 120 upward in the height direction, or both of head unit 120 and shaping stage 140 may be moved in the height direction.

Figure 4:
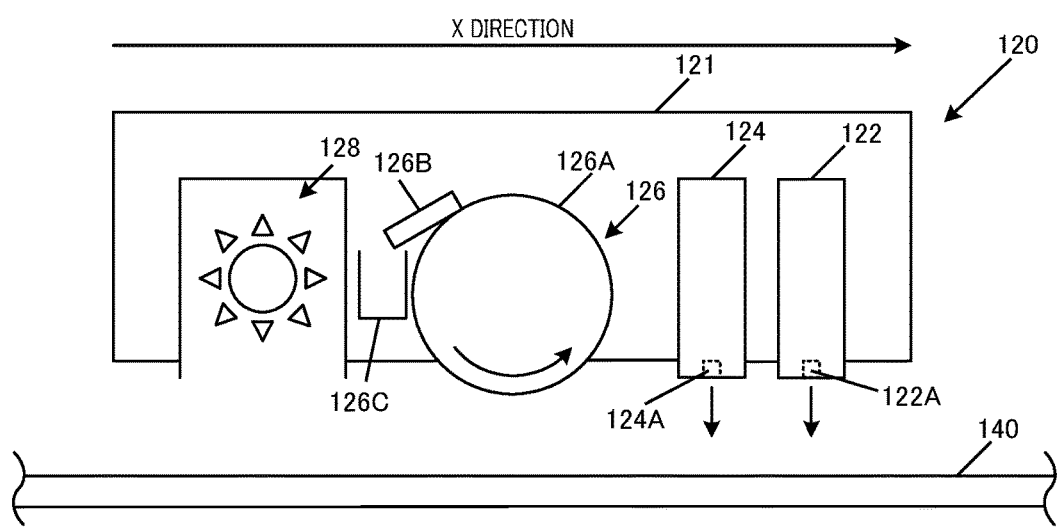
FIG. 4 illustrates a configuration of a head unit according to the embodiment.

As illustrated in FIGS. 3 and 4, head unit 120 includes, in casing 121, ink-jet first discharge part 122 and second discharge part 124, smoothing part 126, and light source 128. In the present embodiment, for the purpose of shaping three-dimensional object 200 of two colors, head unit 120 includes first discharge part 122 and second discharge part 124 which can respectively discharge the shaping materials of two different colors. Head unit 120 may include three or more discharge parts which can respectively discharge shaping materials of different colors. It is also possible to adopt a configuration in which a shaping material serving as a model material which forms a shaping article is discharged from one discharge part, and a shaping material serving as a supporting material which holds the shaping article during the shaping and is removed after the shaping is discharged from the other discharge part.

First discharge part 122 includes a plurality of discharge nozzles 122A linearly arranged in the longitudinal direction (a direction orthogonal to the X direction in FIG. 2). While moving in the main scanning direction (X direction) orthogonal to the longitudinal direction, first discharge part 122 selectively discharges droplets of the shaping material from discharge nozzles 122A toward shaping stage 140. When forming one shaping material layer, first discharge part 122 discharges droplets of the shaping material based on slice data corresponding to the shaping material layer.

As with first discharge part 122, second discharge part 124 includes a plurality of discharge nozzles 124A linearly arranged in the longitudinal direction (a direction orthogonal to the X direction in FIG. 2). While moving in the main scanning direction (X direction) orthogonal to the longitudinal direction, second discharge part 124 selectively discharges droplets of the shaping material from discharge nozzles 124A toward shaping stage 140. When forming one shaping material layer, second discharge part 124 discharges droplets of the shaping material based on slice data corresponding to the shaping material layer.

By the discharging operation of first discharge part 122 and second discharge part 124, a shaping material layer is formed in a desired region on shaping stage 140. The shaping material layer is semi-cured by a curing process with light irradiation. Here, a semi-cured state means a state where the layer is cured to have a viscosity which can maintain the shape of the layer (shaping material layer).

First discharge part 122 and second discharge part 124 are connected with respective shaping material storage tanks (not illustrated) different from each other, and are supplied with shaping material from the shaping material storage tanks. The shaping material storage tank stores the shaping material in the state where the shaping material can be discharged. When the amount of the shaping material in the shaping material storage tank becomes small, the tank may be replenished with shaping material from a replenishment port provided to the shaping material storage tank (replenishment system), or the tank may be replaced with a new shaping material storage tank (cartridge system).

In the present embodiment, as first discharge part 122 and second discharge part 124, discharge parts which can discharge shaping material having a viscosity of 5 to 15 [mPa·s] are employed, for example. As the shaping material, a photosetting material which is curable with irradiation of light having a specific wavelength is used. Examples of the photosetting material include ultraviolet curable resins, and it is possible to use radical polymerized ultraviolet curable resins such as acrylic acid ester and vinyl ether; and cation polymerized ultraviolet curable resins using a combination of an epoxy monomer, an epoxy oligomer, an oxetane monomer, an oxetane oligomer and the like, and acetophenone, benzophenone and the like as a reaction initiator according to the resin. The photosetting material can be stored in a dischargeable state with use of a light blocking member, a filter and the like to block light having a specific wavelength capable of facilitating the curing.

As first discharge part 122 and second discharge part 124, ink-jet heads for image formation of a publicly known conventional continuous system (electric charge particle control system), an on-demand system (piezo system, or bubble-jet (registered trademark) system) or the like is used. In the continuous system, a charged shaping material is continuously discharged, and the electric field is controlled to attach the droplet only by a required amount, while the shaping material which is not required for formation of the shaping material layer is collected by a predetermined shaping material receiver. In the on-demand system, the shaping material is discharged only when the discharging is required for formation of a shaping material layer.

The discharge system of the shaping material in first discharge part 122 and second discharge part 124 may be an electromechanical conversion system (piezo type), an electrothermal conversion system (thermal type), an electrostatic absorption system, or the like.

As long as discharge nozzles 122A and 124A of first discharge part 122 and second discharge part 124 are linearly arranged, the nozzles may be arranged in a straight line, or may be arranged in a zigzag form in a straight line as a whole.

Smoothing part 126 includes levelling roller 126A, scraping member 126B (blade) and collecting member 126C. Levelling roller 126A may be driven into rotation under the control of control part 110, and makes contact with the shaping material discharged by first discharge part 122 and second discharge part 124 to smoothen the irregularity of the surface of the shaping material. As a result, a shaping material layer having a uniform layer thickness is formed.

By smoothing the surface of the shaping material layer, the next shaping material layer can be precisely formed and laminated, and thus three-dimensional object 200 can be shaped with high precision. The shaping material adhering on the surface of levelling roller 126A is scraped by scraping member 126B provided near levelling roller 126A. The shaping material scraped by scraping member 126B is collected by collecting member 126C. It is to be noted that the shaping material scraped by scraping member 126B may be supplied to first discharge part 122 and second discharge part 124 and reused, or may be sent to a waste tank (not illustrated).

Light source 128 performs a curing process (light irradiation process) on the shaping material of a photosetting resin discharged toward shaping stage 140 to semi-cure the shaping material. In the present embodiment, since the shaping material is an ultraviolet curing material, a UV lamp which emits an ultraviolet ray (UV) laser is used as light source 128. It is to be noted that a low-pressure mercury lamp, an intermediate pressure mercury lamp, an ultra-high pressure mercury lamp, a carbon-arc lamp, a high-pressure mercury lamp, a metal halide lamp, a xenon lamp, an ultraviolet LED lamp or the like may be used as light source 128.

Figure 5A:
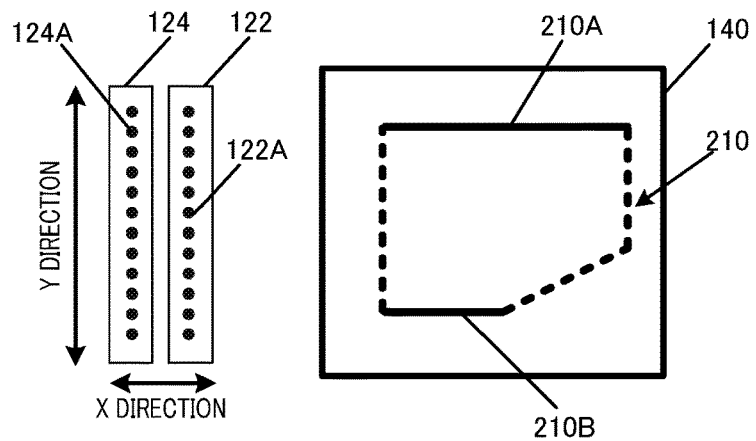
FIG. 5A illustrates a relative rotation position of the main scanning direction of the head unit and a shaping stage.
Figure 5B:
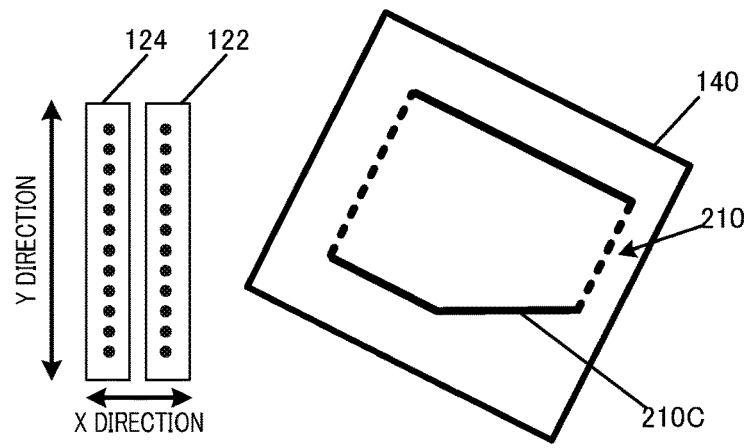
FIG. 5B illustrates a relative rotation position of the main scanning direction of the head unit and a shaping stage.
Figure 5C:
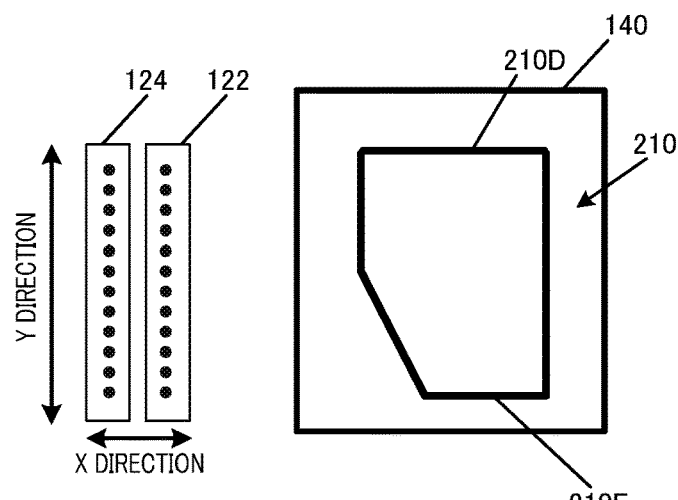
FIG. 5C illustrates a relative rotation position of the main scanning direction of the head unit and a shaping stage.

Next, with reference to FIGS. 5A to 5C, the following describes a case where droplets of the shaping material discharged from head unit 120 including first discharge part 122 and second discharge part 124 while head unit 120 is moved in the main scanning direction (the X direction in the drawing) orthogonal to the arrangement direction of discharge nozzles 122A and 124A (the Y direction in the drawing) to shape a pentagon composed of a plurality of line segments (straight lines 210A to 210E) as shaping material layer 210 (two-dimensional image).

As illustrated in FIG. 5A, when forming straight lines 210A and 210B of shaping material layer 210, control part 110 controls stage rotation movement part 130 to rotate shaping stage 140 such that the main scanning direction (the X direction in the drawing) of first discharge part 122 and second discharge part 124 is parallel to straight lines 210A and 210B. Thereafter, control part 110 controls head unit movement part 150 to move head unit 120 in the main scanning direction (the X direction in the drawing), while controlling first discharge part 122 and second discharge part 124 to discharge droplets of the shaping material. In this manner, since straight lines 210A and 210B are printed with use of one or a limited number of discharge nozzles 122A, or/and one or a limited number of discharge nozzles 124A, almost no deflection of the droplets with respect to the arrangement direction of discharge nozzles 122A and 124A (the Y direction in the drawing) is caused, and the jaggy formed in straight lines 210A and 210B is reduced. As a result, in comparison with the case where printing is performed using a plurality of discharge nozzles 122A (124A), the line width of straight lines 210A and 210B is uniformized, and the reproducibility of straight lines 210A and 210B can be increased.

Next, as illustrated in FIG. 5B, when forming straight line 210C of shaping material layer 210, control part 110 controls stage rotation movement part 130 to rotate shaping stage 140 such that the main scanning direction (the X direction in the drawing) of first discharge part 122 and second discharge part 124 is parallel to straight line 210C. Thereafter, without changing the relative angle position of the arrangement direction of discharge nozzles 122A and 124A and shaping stage 140, control part 110 controls first discharge part 122 and second discharge part 124 to discharge droplets of the shaping material while controlling head unit movement part 150 to move head unit 120 in the main scanning direction (the X direction in the drawing). In this manner, since straight line 210C is printed with use of one or a limited number of discharge nozzles 122A, or/and one or a limited number of discharge nozzles 124A, almost no deflection of the droplets with respect to the arrangement direction of discharge nozzles 122A and 124A (the Y direction in the drawing) is caused, and jaggy formed in straight line 210C is reduced. As a result, in comparison with the case where printing is performed using a plurality of discharge nozzles 122A (124A), the line width of straight line 210C is uniformized, and the reproducibility of straight line 210C can be increased.

Finally, as illustrated in FIG. 5C, when forming straight lines 210D and 210E of shaping material layer 210, control part 110 controls stage rotation movement part 130 to rotate shaping stage 140 such that the main scanning direction (the X direction in the drawing) of first discharge part 122 and second discharge part 124 is parallel to straight lines 210D and 210E. Thereafter, without changing the relative angle position of the arrangement direction of discharge nozzles 122A and 124A and shaping stage 140, control part 110 controls first discharge part 122 and second discharge part 124 to discharge droplets of the shaping material while controlling head unit movement part 150 to move head unit 120 in the main scanning direction (the X direction in the drawing). In this manner, since straight lines 210D and 210E are printed with use of one or a limited number of discharge nozzles 122A or/and one or a limited number of discharge nozzles 124A, almost no deflection of the droplets with respect to the arrangement direction of discharge nozzles 122A and 124A (the Y direction in the drawing) is caused, and the jaggy formed in straight lines 210D and 210E is reduced. As a result, in comparison with the case where printing is performed using a plurality of discharge nozzles 122A (124A), the line width of straight lines 210D and 210E is uniformized, and the reproducibility of straight lines 210D and 210E can be increased. After forming the parts of the frame (straight lines 210A to 210E), droplets of the shaping material is discharged from the entire head unit 120 to fill the inner portion of the frame, and thus one shaping material layer can be formed. Discharging may be performed to fill the inner portion of the frame with scanning identical to that for forming the straight lines 210D and 210E of the frame in FIG. 5C, or discharging may be performed to fill the inner region (inner portions of the frame) in the process of FIG. 5A or FIG. 5B.

As described above, anisotropy of the reproducibility of printed straight lines 210A to 210E is not caused, and the reproducibility of each of straight lines 210A to 210E can be increased. That is, the quality of shaping material layer 210 formed by head unit 120 can be improved. Consequently, the quality of three-dimensional object 200 which is shaped by sequentially forming and laminating shaping material layer 210 can be improved.

Effect of the Present Embodiment

As has been described in detail, in the present embodiment, a three-dimensional shaping apparatus 100 includes: first discharge part 122 and second discharge part 124 including a plurality of linearly arranged discharge nozzles, the first discharge part 122 and second discharge part 124 being configured to discharge an image formation material toward a stage 140 from the discharge nozzles 122A, 124A; a main scanning direction movement part including a guide member 151 configured to guide movement of at least one of the first discharge part 122 and second discharge part 124 and the stage 140 in a main scanning direction (X direction) intersecting with an arrangement direction of the discharge nozzles 122A, 124A, the main scanning direction movement part being configured to relatively move the first discharge part 122 and second discharge part 124 with respect to the stage 140 along the guide member; and a rotation part configured to rotate at least one of the guide member 151 and the stage 140 in a plane parallel to the stage 140 to change a relative rotation position of the main scanning direction and the stage 140; a height direction movement part configured to move at least one of the first discharge part 122 and second discharge part 124 and the stage 140 in a height direction.

According to the above-mentioned configuration of the present embodiment, the relative rotation position of the main scanning direction of first discharge part 122 and second discharge part 124 and shaping stage 140 can be arbitrarily changed. In other words, it is possible to arbitrarily change the degree of the parallelism between straight lines 210A to 210E of shaping material layer 210 (two-dimensional image) formed on shaping stage 140 and the movement direction of first discharge part 122 and second discharge part 124 (discharge nozzles 122A and 124A) with respect to shaping stage 140. Accordingly, the reproducibility of the line width of straight lines 210A to 210E of shaping material layer 210 can be arbitrarily controlled as desired by the user. When the straight lines form the surface of three-dimensional object 200 which is obtained by repeatedly laminating the shaping material layer, the reproducibility of the shape of the surface of three-dimensional object 200 can be controlled.

Modification

While the shaping material layer is formed using a shaping material having a photosetting property in the above-mentioned embodiment, the present invention is not limited to this example. For example, the shaping material layer may be formed using a shaping material having thermoplasticity, thermosetting property or curability by chemical reaction.

In addition, while shaping stage 140 is rotated with respect to guide member 151 of head unit movement part 150 to change the relative rotation position of the main scanning direction of first discharge part 122 and second discharge part 124 and shaping stage 140 in the above-mentioned embodiment, the present invention is not limited to this example. For example, the relative rotation position of the main scanning direction of first discharge part 122 and second discharge part 124 and shaping stage 140 may be changed by rotating guide member 151 with respect to shaping stage 140. In addition, the relative rotation position of the main scanning direction of first discharge part 122 and second discharge part 124 and shaping stage 140 may be changed by rotating both guide member 151 and shaping stage 140. The following describes a configuration in which head unit movement part 150 is rotated with respect to shaping stage 140.

Figure 6:
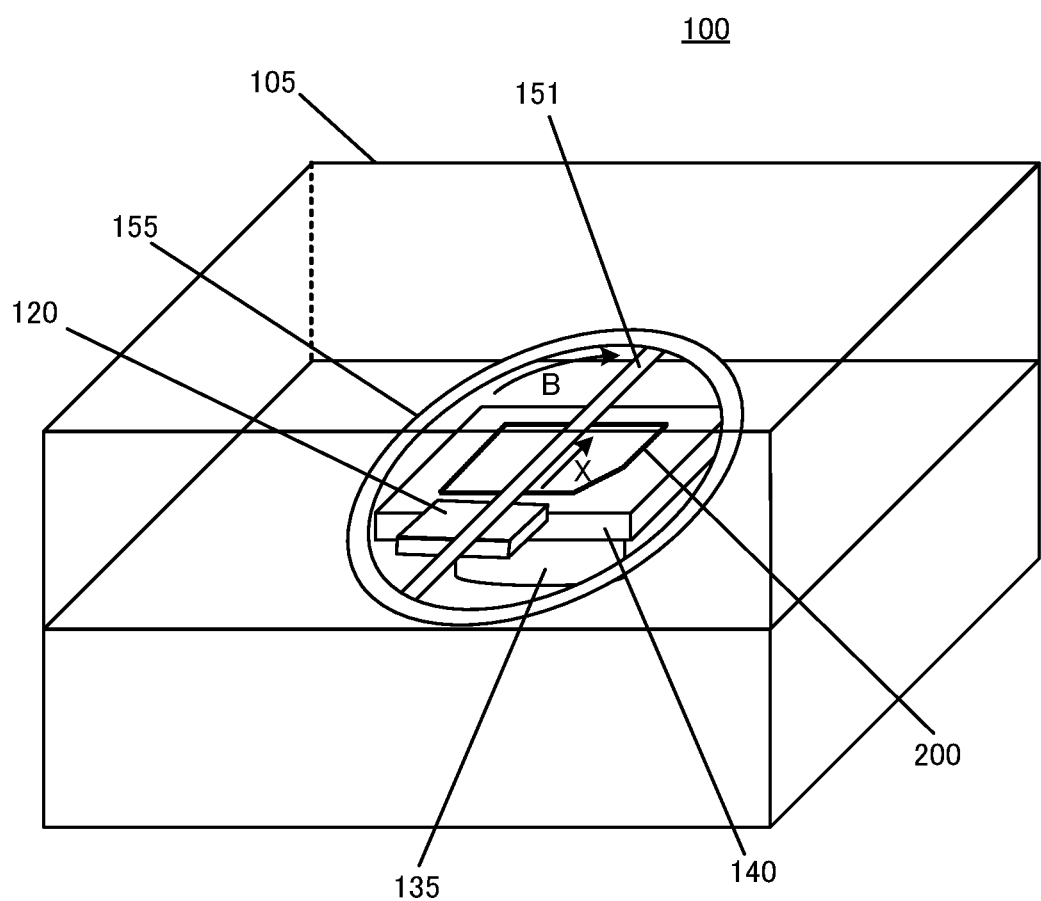
FIG. 6 schematically illustrates a modification of the configuration of the three-dimensional shaping apparatus according to the embodiment.
Figure 7:
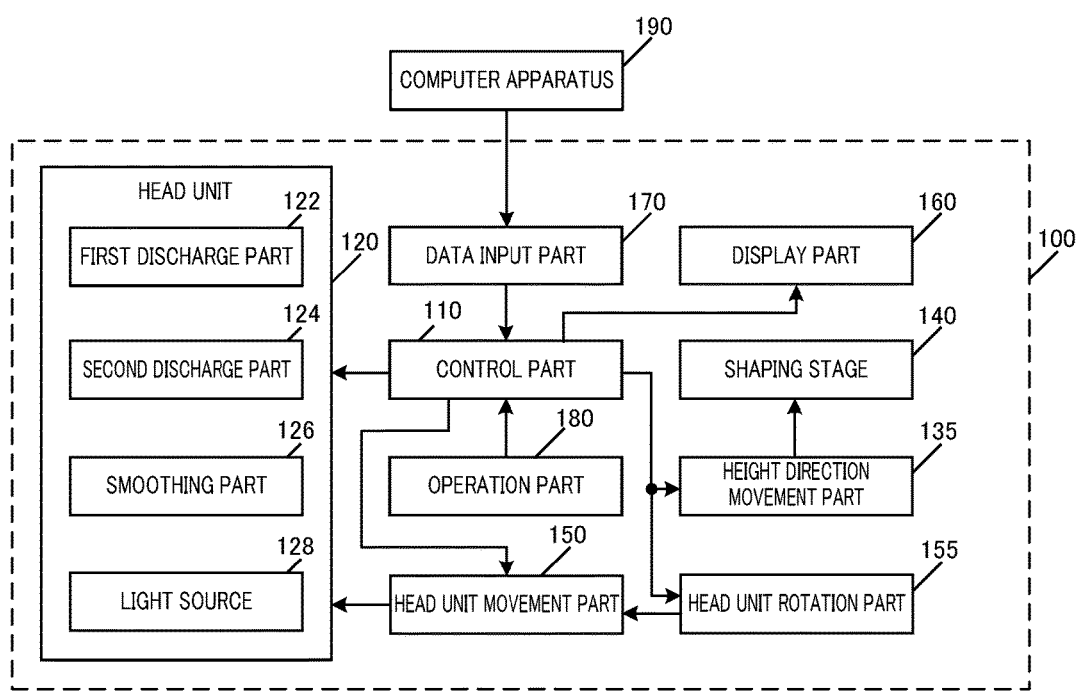
FIG. 7 illustrates a modification of the principal part of the control system of the three-dimensional shaping apparatus according to the embodiment.

FIG. 6 schematically illustrates a configuration of three-dimensional shaping apparatus 100 in the case where guide member 151 of head unit movement part 150 is rotated with respect to shaping stage 140. FIG. 7 illustrates a principal part of a control system of three-dimensional shaping apparatus 100 in the case where guide member 151 is rotated with respect to shaping stage 140. As illustrated in FIGS. 6 and 7, three-dimensional shaping apparatus 100 includes height direction movement part 135 and guide rotation part 155 in place of stage rotation movement part 130 of FIG. 3.

Height direction movement part 135 itself goes down in accordance with the mechanism controlling information output from control part 110 to move shaping stage 140 downward in the height direction (the vertical direction in FIG. 6) and adjust the distance between head unit 120 and three-dimensional object 200. That is, shaping stage 140 can be moved in the height direction by height direction movement part 135, and is moved downward in the height direction by the lamination pitch after Nth shaping material layer is formed on shaping stage 140. Then, after N+1th shaping material layer is formed on shaping stage 140, shaping stage 140 is again moved downward in the height direction by the lamination pitch. It is to be noted that head unit 120 may be moved upward in the height direction with the position of shaping stage 140 in the height direction fixed, or both head unit 120 and shaping stage 140 may be moved in the height direction.

Guide rotation part 155 is a rotation guide engaged with both end portions of guide member 151 for guiding head unit 120 in the main scanning direction. Guide rotation part 155 rotates guide member 151 in the arrow B direction around the rotation axis extending along the vertical direction in a plane parallel to the shaping material supporting surface of shaping stage 140. That is, guide rotation part 155 changes the relative rotation position of the movement direction (main scanning direction, arrow X direction) of head unit 120 by head unit movement part 150 and shaping stage 140. The rotational direction B may be clockwise or counterclockwise as viewed from the upper side of shaping stage 140.

Figure 8A:
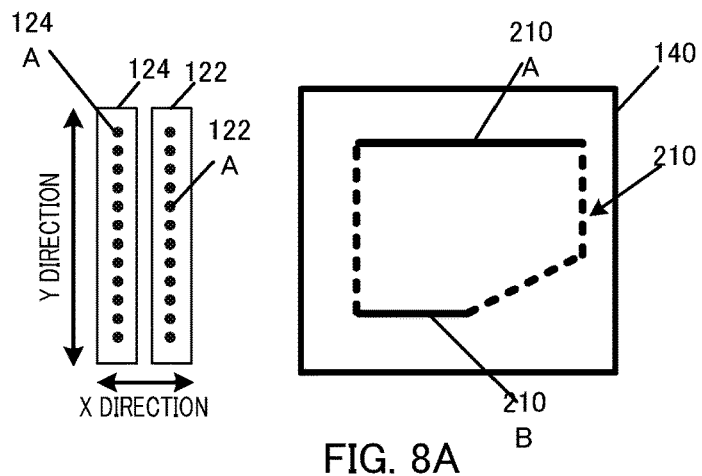
FIG. 8A illustrates a relative rotation position of the main scanning direction of the head unit and the stage.
Figure 8B:
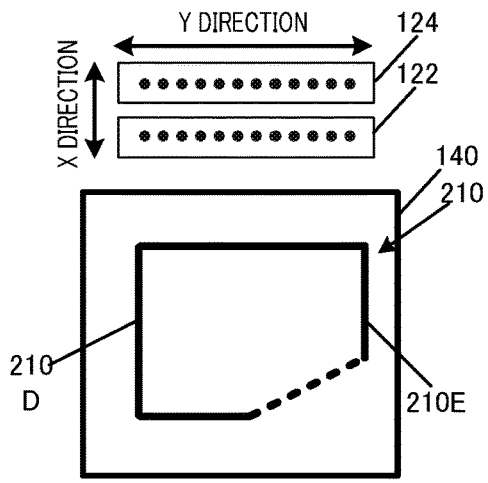
FIG. 8B illustrates a relative rotation position of the main scanning direction of the head unit and the stage.
Figure 8C:
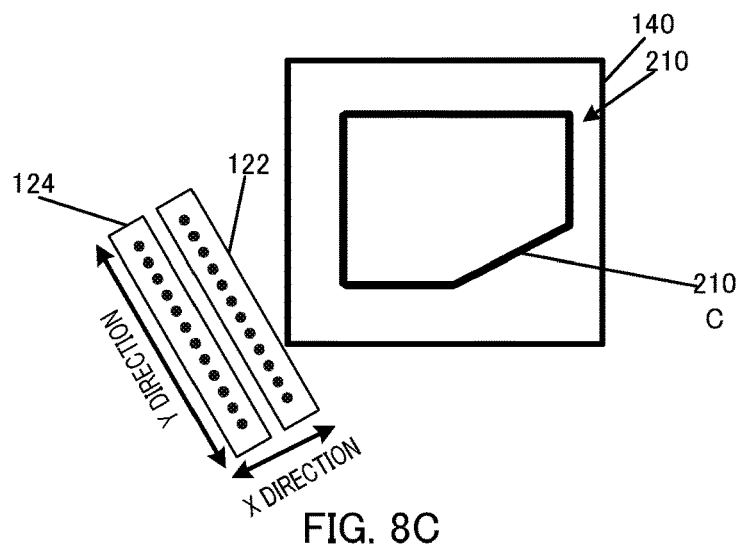
FIG. 8C illustrates a relative rotation position of the main scanning direction of the head unit and the stage.

Next, with reference to FIGS. 8A to 8C, the following describes the case where droplets of the shaping material are discharged while moving head unit 120 including first discharge part 122 and second discharge part 124 in the main scanning direction (the X direction in the drawing) orthogonal to the arrangement direction of discharge nozzles 122A and 124A (the Y direction in the drawing) to form a pentagon composed of a plurality of line segments (straight lines 210A to 210E) as shaping material layer 210 (two-dimensional image).

As illustrated in FIG. 8A, when forming straight lines 210A and 210B of shaping material layer 210, control part 110 controls guide rotation part 155 to rotate guide member 151 of head unit movement part 150 such that the main scanning direction of first discharge part 122 and second discharge part 124 (the X direction in the drawing) is parallel to straight lines 210A and 210B. Thereafter, control part 110 controls head unit movement part 150 to move head unit 120 in the main scanning direction (the X direction in the drawing) while controlling first discharge part 122 and second discharge part 124 to discharge droplets of the shaping material. In this manner, since straight lines 210A and 210B are printed with use of one or a limited number of discharge nozzles 122A, or/and one or a limited number of discharge nozzles 124A, almost no deflection of the droplets with respect to the arrangement direction of discharge nozzles 122A and 124A (the Y direction in the drawing) is caused, and the jaggy formed in straight lines 210A and 210B is reduced. As a result, in comparison with the case where printing is performed using a plurality of discharge nozzles 122A (124A), the line width of straight lines 210A and 210B is uniformized, and the reproducibility of straight lines 210A and 210B can be increased.

As illustrated in FIG. 8B, when forming straight lines 210D and 210E of shaping material layer 210, control part 110 controls guide rotation part 155 to rotate guide member 151 such that the main scanning direction of first discharge part 122 and second discharge part 124 (the X direction in the drawing) is parallel to straight lines 210D and 210E. Thereafter, without changing the relative angle position the arrangement direction of discharge nozzles 122A and 124A and shaping stage 140, control part 110 controls first discharge part 122 and second discharge part 124 to discharge droplets of the shaping material while controlling head unit movement part 150 to move head unit 120 in the main scanning direction (the X direction in the drawing). In this manner, since straight lines 210D and 210E are printed with use of one or a limited number of discharge nozzles 122A, or/and one or a limited number of discharge nozzles 124A, almost no deflection of the droplets with respect to the arrangement direction of discharge nozzles 122A and 124A (the Y direction in the drawing) is caused, and the jaggy formed in straight lines 210D and 210E is reduced. As a result, in comparison with the case where printing is performed using a plurality of discharge nozzles 122A (124A), the line width of straight lines 210D and 210E is uniformized, and the reproducibility of straight lines 210D and 210E can be increased.

As illustrated in FIG. 8C, when forming straight line 210C of shaping material layer 210, control part 110 controls guide rotation part 155 to rotate guide member 151 such that the main scanning direction of first discharge part 122 and second discharge part 124 (the X direction in the drawing) is parallel to straight line 210C. Thereafter, without changing the relative angle of the arrangement direction of discharge nozzles 122A and 124A and shaping stage 140, control part 110 controls first discharge part 122 and second discharge part 124 to discharge droplets of the shaping material while controlling head unit movement part 150 to move head unit 120 in the main scanning direction (the X direction in the drawing). In this manner, since straight line 210C is printed with use of one or a limited number of discharge nozzles 122A, or/and one or a limited number of discharge nozzles 124A, almost no deflection of the droplets with respect to the arrangement direction of discharge nozzles 122A and 124A (the Y direction in the drawing) is caused, and the jaggy formed in straight line 210C is reduced. As a result, in comparison with the case where printing is performed using a plurality of discharge nozzles 122A (124A), the line width of straight line 210C is uniformized, and the reproducibility of straight line 210C can be increased.

As described above, anisotropy of the reproducibility of printed straight lines 210A to 210E is not caused, and the reproducibility of each of straight lines 210A to 210E can be increased. That is, the quality of shaping material layer 210 formed by head unit 120 can be improved. Consequently, the quality of three-dimensional object 200 shaped by sequentially forming and laminating shaping material layer 210 can be improved.

Figure 9:
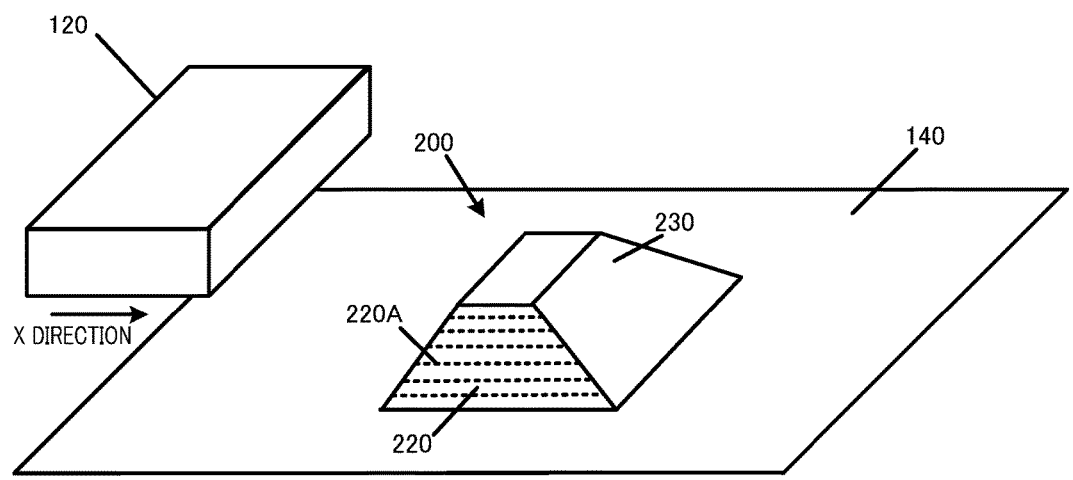
FIG. 9 is an explanatory view of a relationship between the main scanning direction of the head unit and a lamination trace formed in a three-dimensional object.

In addition, in the above-mentioned embodiment, shaping stage 140 may be rotated such that the main scanning direction of head unit 120 (first discharge part 122, second discharge part 124) is not parallel to the straight line of shaping material layer 210 (two-dimensional image). FIG. 9 illustrates a state where three-dimensional object 200 having a square pyramid shape is shaped by forming shaping material layer 210 (two-dimensional image) by discharging droplets of the shaping material while moving head unit 120 in the main scanning direction (the X direction in the drawing), and by laminating the formed shaping material layer 210. Three-dimensional object 200 is shaped by sequentially forming and laminating quadrangles each composed of a plurality of line segments (straight line) as shaping material layer 210 (two-dimensional image). In this case, lamination trace 220A may be formed on surface 220 parallel to the X direction of three-dimensional object 200 in the lamination direction of shaping material layer 210. Lamination trace 220A is formed as follows. Specifically, when straight lines of surface 220 of shaping material layer 210 are formed, the movement direction of head unit 120 is not parallel to the straight line, and an edge parallel to the X direction of each shaping material layer 210 is exposed at the surface of the shaping article in such a manner as to form steps. On the other hand, a clear lamination trace in the lamination direction of shaping material layer 210 is not easily formed on surface 230 intersecting with the X direction of three-dimensional object 200. One reason for this is that, when straight lines forming surface 230 of shaping material layer 210 is formed, the movement direction of head unit 120 is not parallel to the straight line, and jaggy is increased at an edge intersecting with the X direction of each shaping material layer 210, and as a result, minute random irregularity is formed on surface 230. In view of this, when straight lines forming surface 220 of shaping material layer 210 are formed, shaping stage 140 is rotated such that the movement direction of head unit 120 is not parallel to the straight line. In this manner, jaggy is increased in the straight lines forming surface 220 (that is, the reproducibility of the line width of the straight lines is varied), thus making it possible to make lamination trace 220A formed on surface 220 less noticeable. Accordingly, in the case where the external appearance of three-dimensional object 200 is an important factor, the lamination trace can be reduced over the entire surface of three-dimensional object 200 by forming each shaping material layer 210 such that jaggy is increased over the whole circumference.

In addition, while shaping stage 140 is rotated such that the jaggy formed in all of the straight lines of shaping material layer 210 (two-dimensional image) is reduced in the above-mentioned embodiment, the present invention is not limited to this. The user may arbitrarily select the straight line to reduce the jaggy formed therein. In this case, the user may arbitrarily select a straight line to reduce the jaggy formed therein at the time point when data input part 170 receives 3D data from computer apparatus 190.

In addition, in the above-mentioned embodiment, three-dimensional shaping apparatus 100 can function as "two-dimensional image forming apparatus" of the embodiment of the present invention which discharges an image formation material (ink) toward shaping stage 140 to form a two-dimensional image. In this case, smoothing part 126 and light source 128 are not unnecessary in head unit 120. As with the above-mentioned embodiment, by rotating shaping stage 140 such that the main scanning direction (movement direction) of head unit 120 is parallel to a straight line in a certain direction of a two-dimensional image formed on shaping stage 140, the line width of the straight line can be stabilized, and consequently the printing quality of the two-dimensional image can be improved. It is to be noted that the ink used for the image formation material may not contain color material. When color material is contained, the color material may be dye or pigment as long as first discharge part 122 and second discharge part 124 can discharge the color material. The solvent included in the ink may be aqueous solvent or oily solvent.

Figure 10A:
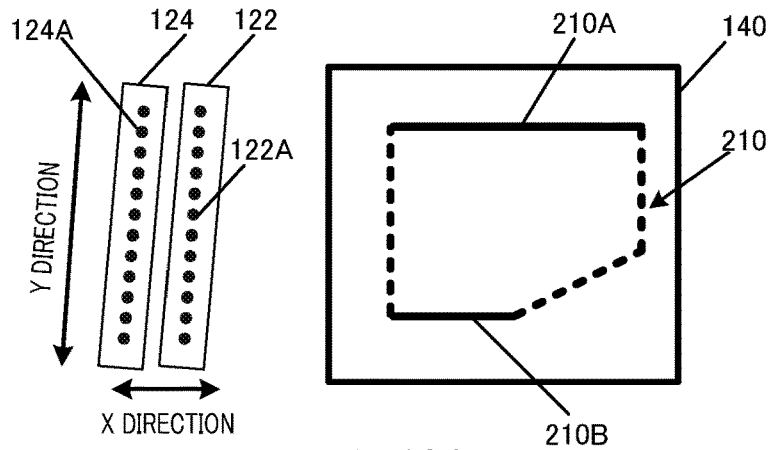
FIG. 10A illustrates a relative rotation position of the main scanning direction of the head unit and the shaping stage.
Figure 10B:
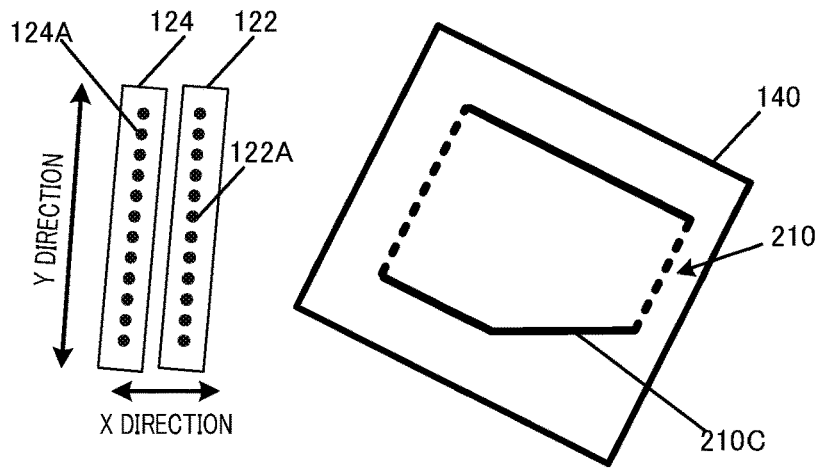
FIG. 10B illustrates a relative rotation position of the main scanning direction of the head unit and the shaping stage.
Figure 10C:
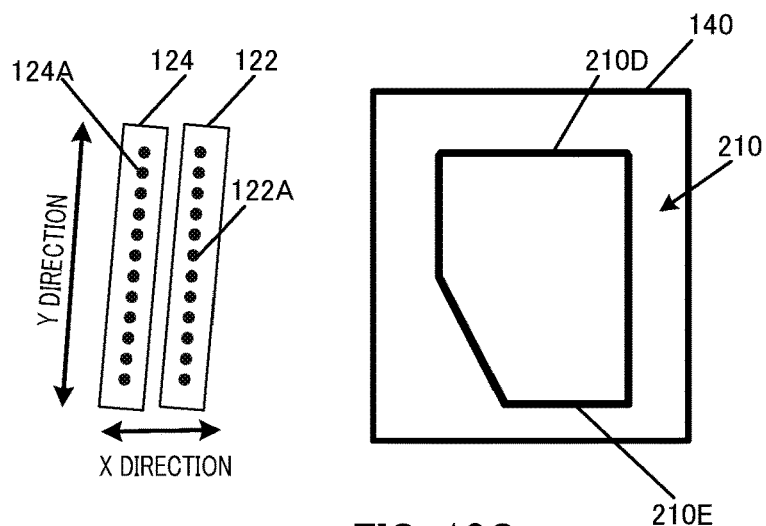
FIG. 10 C illustrates a relative rotation position of the main scanning direction of the head unit and the shaping stage.

In addition, in the above-mentioned embodiment, it suffices that discharge nozzles 122A and 124A intersect with the main scanning direction and discharge nozzles 122A and 124A may not be perpendicularly arranged. For example, discharge nozzles 122A and 124A may be arranged such that discharge nozzles 122A and 124A obliquely intersect with the main scanning direction. In this case, the resolution of the two-dimensional images forming three-dimensional object 200 can be increased. In this case, as illustrated in FIG. 10A to FIG. 10C, except that the arrangement direction of discharge nozzles 122A and 124A (the Y direction in the drawing) is oblique to the main scanning direction, and that discharge nozzles 122A and 124A move in the main scanning direction with the arrangement direction tilted, an operation same as the operation described with FIGS. 5A to 5C is performed. With this configuration, the resolution can be increased.

In addition, in the above-mentioned embodiment, a circle or an arc may be printed by discharging the shaping material from discharge nozzles 122A and 124A while relatively rotating shaping stage 140 and guide member 151 with the main scanning of first discharge part 122 and second discharge part 124 by guide member 151 stopped.

It should be understood by those skilled in the art that various modifications, combinations, sub-combinations and alterations may occur depending on design requirements and other factors in so far as they are within the scope of the appended claims or the equivalents thereof. While the invention made by the present inventor has been specifically described based on the preferred embodiments, it is not intended to limit the present invention to the above-mentioned preferred embodiments but the present invention may be further modified within the scope and spirit of the invention defined by the appended claims.

REFERENCE SIGNS LIST

100 Three-dimensional shaping apparatus
105, 121 Casing
110 Control part
120 Head unit
122 First discharge part
122A, 124A Discharge nozzle
124 Second discharge part
126 Smoothing part
126A Levelling roller
126B Scraping member
126C Collecting member
128 Light source
130 Stage rotation movement part
135 Height direction movement part
140 Shaping stage
150 Head unit movement part
151 Guide member
155 Guide rotation part
160 Display part
170 Data input part
180 Operation part
190 Computer apparatus
200 Three-dimensional object
210 Shaping material layer
210A, 210B, 210C, 210D, 210E Straight line
220, 230 Surface
220A Lamination trace

What is claimed is:

1. A two-dimensional image forming apparatus comprising:

a head unit containing a discharge part including a plurality of linearly arranged discharge nozzles and a smoothing part, the discharge part being configured to discharge an image formation material toward a stage from the discharge nozzles, and the smoothing part comprising a roller;

a main scanning direction movement part including a guide member configured to guide movement of at least one of the head unit and the stage in a main scanning direction orthogonal to an arrangement direction of the discharge nozzles, the main scanning direction movement part being configured to relatively move the discharge part with respect to the stage along the guide member;

a rotation part configured to rotate at least one of the guide member and the stage in a plane parallel to the stage to change a relative rotation position of the main scanning direction and the stage, and a control part configured to control the head unit, the main scanning direction movement part, and the rotation part, wherein when forming a two-dimensional image on the stage with the image formation material discharged from the discharge nozzles, the control part:

determines a minimal rotation for the rotation part to continuously position the relative position of the main scanning direction and the stage such that during discharge of the image formation material, the main scanning direction is parallel to each line segment of the two-dimensional image being formed, discharges the image formation material toward the stage through one of the plurality of linearly arranged discharge nozzles, while the rotation part is continuously positioned according to the determined minimal rotation, and smooths the formed material using the smoothing part, wherein each formed line segment of the two-dimensional image has a uniformized width.

2. The two-dimensional image forming apparatus according to claim 1, wherein the rotation part rotates at least one of the guide member and the stage such that the main scanning direction is parallel to a straight line of the two-dimensional image.

3. The two-dimensional image forming apparatus according to claim 1, wherein the rotation part rotates the stage.

4. The two-dimensional image forming apparatus according to claim 1, wherein the rotation part rotates the guide member.

5. A three-dimensional shaping apparatus comprising:

a head unit containing a discharge part including a plurality of linearly arranged discharge nozzles and a smoothing part, the discharge part being configured to discharge an image formation material toward a stage from the discharge nozzles, and the smoothing part comprising a roller;

a main scanning direction movement part including a guide member configured to guide movement of at least one of the head unit and the stage in a main scanning direction orthogonal to an arrangement direction of the discharge nozzles, the main scanning direction movement part being configured to relatively move the discharge part with respect to the stage along the guide member;

a rotation part configured to rotate at least one of the guide member and the stage in a plane parallel to the stage to change a relative rotation position of the main scanning direction and the stage;

a height direction movement part configured to move the stage in a height direction, wherein a three-dimensional object is shaped by sequentially forming a two-dimensional image on a shaping surface on the stage with the image formation material discharged from the discharge nozzles and by laminating the two-dimensional image in the height direction; and a control part configured to control the head unit, the main scanning direction movement part, the rotation part, and the height direction movement part wherein when forming a two-dimensional image on the stage with the image formation material discharged from the discharge nozzles, the control part:

determines a minimal rotation for the rotation part to continuously position the relative position of the main scanning direction and the stage such that during discharge of the image formation material, the main scanning direction is parallel to each line segment of the two-dimensional image being formed, discharges the image formation material toward the stage through one of the plurality of linearly arranged discharge nozzles while the rotation part is continuously positioned according to the determined minimal rotation, and smooths the formed material using the smoothing part, wherein each formed line segment in the two-dimensional image has a uniformized width.

6. The three-dimensional shaping apparatus according to claim 5, wherein the rotation part rotates at least one of the guide member and the stage such that the main scanning direction is parallel to a straight line of the two-dimensional image.

7. The three-dimensional shaping apparatus according to claim 5, wherein the rotation part rotates at least one of the guide member and the stage such that the main scanning direction is not parallel to a straight line of the two-dimensional image.

8. The three-dimensional shaping apparatus according to claim 5, wherein the rotation part rotates the stage.

9. The three-dimensional shaping apparatus according to claim 5, wherein the rotation part rotates the guide member.

* * * * *